United States Patent [19]

Layer et al.

[11] 3,735,985
[45] May 29, 1973

[54] ROCKET PROPELLED TARGET

[75] Inventors: Gerard E. Layer, Newport Beach; John A. Kreuzer, Mission Viejo; John S. Yates, Placentia, all of Calif.

[73] Assignee: The Susquehanna Corporation, Fairfax County, Va.

[22] Filed: Oct. 15, 1970

[21] Appl. No.: 80,874

[52] U.S. Cl. ............ 273/105.4, 244/3.24, 102/49.3
[51] Int. Cl. ................................................ F41j 9/06
[58] Field of Search .................... 273/105.3; 60/35.6; 102/49.3, 49.4; 244/3.23, 3.24; 46/74 A, 74 B, 74 C

[56] References Cited

UNITED STATES PATENTS

| 3,067,682 | 12/1962 | Feldman | 244/3.23 |
|---|---|---|---|
| 2,492,835 | 12/1949 | Bjork | 60/35.6 |
| 2,678,214 | 5/1954 | Brewer | 273/105.3 |
| 3,029,704 | 4/1962 | Truax | 102/49.3 |
| 2,869,120 | 1/1959 | Lolmaugh | 273/105.3 |

Primary Examiner—Richard C. Pinkham
Assistant Examiner—Marvin Siskind
Attorney—Tipton D. Jennings

[57] ABSTRACT

A rocket vehicle suitable for use as an airborne training target is disclosed. The vehicle frame is manufactured of aluminum or other lightweight material having high structural strength and includes a longitudinally extending elongated center member to which are attached a nose cone, fin sections and one or more rocket motors. Attached to the rear of the vehicle are a series of lightweight banners. By varying the length of the banners and the number of rocket motors, visual cross-section as well as the performance characteristics of the vehicle may be varied. The rocket vehicle may be adapted for firing of the rocket motors in sequence with the time of firing controlled in order to obtain sustained high velocity flight over an extended range or to vary the performance of the vehicle during flight.

16 Claims, 4 Drawing Figures

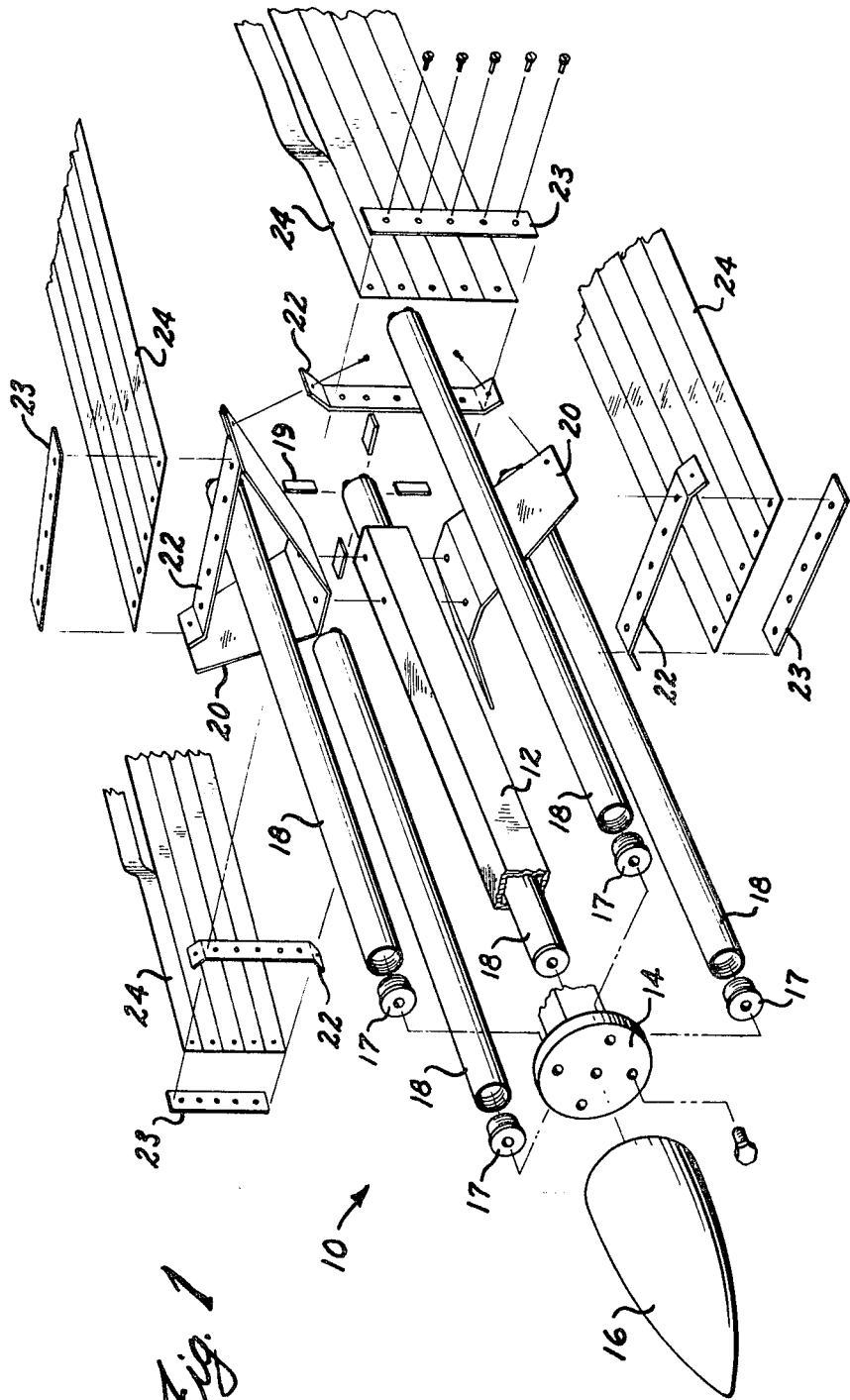

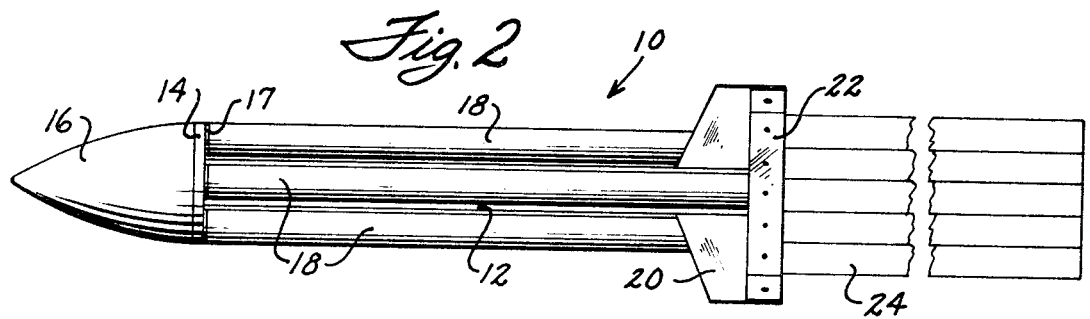
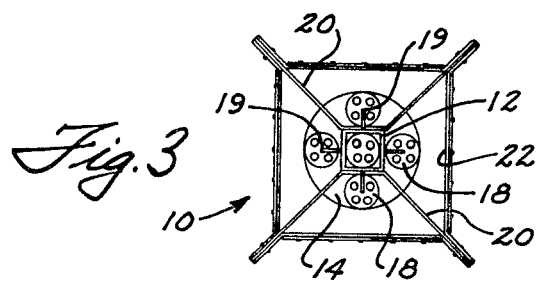
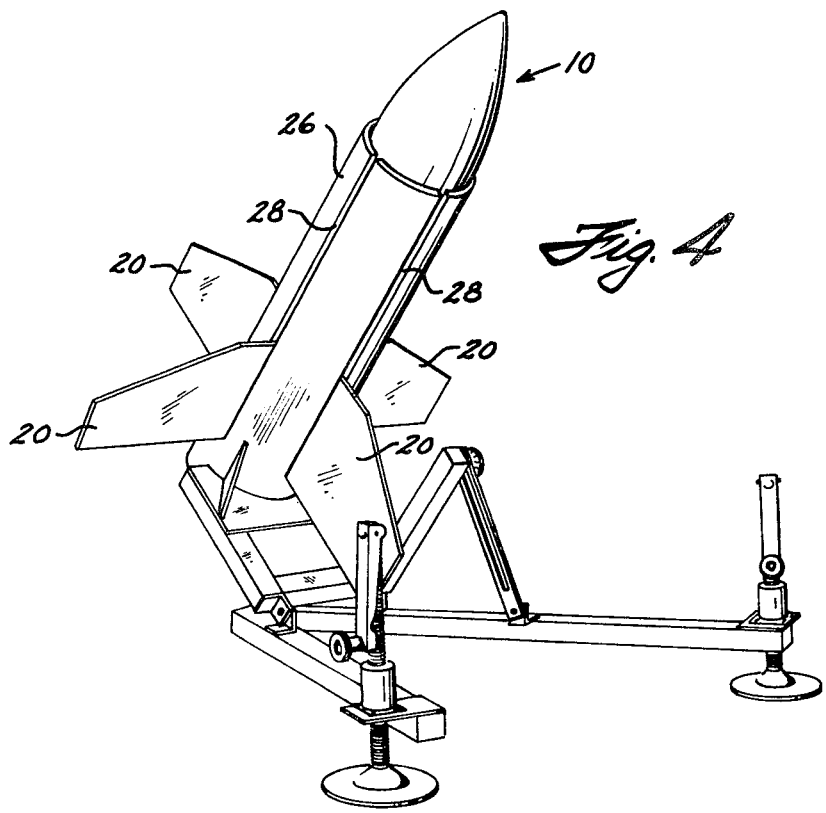

ROCKET PROPELLED TARGET

BACKGROUND AND SUMMARY OF THE INVENTION

This invention relates to apparatus for use as an airborne training target. More particularly this invention relates to a high velocity, rocket powered, airborne training target having a variable visual cross-section and variable performance characteristics.

Previous targets used for the training of air defense crews in aerial gunnery and missile firing practice have included targets such as cylindrical sleeves towed behind aircraft by means of cables or lines attached between the aircraft and the target. Although such targets may be towed by high-speed aircraft, the performance of the target varies from that of the aircraft due to drag and turbulence effects and also the fact that such towed targets follow a sweeping flight path rather than simulating the high-speed maneuvers characteristic of modern aircraft.

In accordance with the purpose of this invention, as embodied and broadly described herein, the rocket vehicle of this invention includes an elongated center member having a forward end and a rear portion, a plate attached to the forward end of said center member, said plate being adapted to receive and support the front end of at least one rocket motor, a nose cone secured to said plate, at least one rocket motor mounted on said plate and extending essentially parallel to said center member, and a plurality of fins attached to the rear portion of said elongated center member. Preferably, there is provided an inexpensive, high velocity air defense training target having a variable visual cross-section and variable performance characteristics. The target vehicle of the present invention has a body formed of a lightweight material such as aluminum. The body of the vehicle is provided with mounting brackets for mounting one or more rocket motors. The number of motors may be varied prior to flight in order to alter the velocity of the vehicle. In addition the rocket motors may be set for firing in sequence in order to vary the performance of the vehicle during flight. Attached to the rear of the rocket vehicle are a series of banners of polymeric material or other suitable lightweight, flexible material. The length of the banners may be varied in order to provide the desired visual cross-section for the training of air defense crews.

Referring to the drawings:

FIG. 1 is an exploded view in perspective of a rocket vehicle constructed in accordance with the principles of the present invention;

FIG. 2 is a side elevational view of a fully assembled rocket vehicle constructed in accordance with the principles of the present invention;

FIG. 3 is a rear elevational view of the rocket vehicle shown in FIG. 2; and

FIG. 4 is a perspective view of a launching platform which can be employed in conjunction with the rocket vehicle of the present invention.

DESCRIPTION OF THE PREFERRED EMBODIMENTS

In the illustrated embodiment of the present invention as shown in FIGS. 1, 2 and 3, there is provided a rocket propelled target vehicle 10 which includes a longitudinally extending center member 12 formed of a lightweight, substantially rigid material having relatively high structural strength such as aluminum or other similar material. Attached to the forward end of center member 12 is a base plate 14 on the front surface of which is mounted a nose cone 16. Attached to the rear face of the base plate 14 are a plurality of mounting brackets 17 each of which is preferably threaded to receive a rocket motor 18 which extends along the longitudinal axis of the target vehicle essentially parallel to the center member 12. The base plate, the nose cone and the mounting brackets are formed of aluminum or other similar material. Each rocket motor 18 which may be positioned around the outer circumference of the center member 12 is attached near the rear portion of the center member 12 by a lug 19 formed of aluminum or similar material and secured by conventional means such as nut-and-bolt connections. The center member 12 is preferably of square cross-section and is also preferably hollow to allow a rocket motor 18 to be received within the member 12. Secured to the rear portion of center member 12 are a plurality of fin sections 20 to which are attached braces 22 between adjacent fins for use in providing structural stability. The fin sections 20 and braces 22 may be formed of any suitable lightweight material such as aluminum. The fins may be positioned at any angle relative to each other such that stable flight is achieved. In one embodiment, four fins are employed with an angle of 90° between adjacent fins. The various components of the rocket vehicle are connected as described by any suitable connection such as nut-and-bolt connections or rivet connections in order to obtain a strong, lightweight airframe.

Mounted on the braces 22 and secured by metal plates 23 or other suitable means are a series of lightweight banners 24 to be used in providing the visual cross-section necessary for training air defense crews. These banners may be formed of a polymeric material such as polyethylene or other lightweight flexible material and may be of any suitable size such that the desired flight and visual characteristics are imparted to the vehicle. Good results have been obtained with banners each of which has a width of about 2 to 4 inches and a length of about 5 to 20 feet. The banners are generally folded in a stowed position prior to launch so that as the rocket vehicle lifts off the ground during launch, the banners are unfurled and streamed behind the vehicle.

The rocket motor employed may be any of the motors normally employed with rocket vehicles of this type. The rocket motor employed preferably utilizes a solid propellant propulsion system which may be of any suitable or conventional construction. As shown in FIG. 1, preferably the rocket motor 18 is provided with an internally threaded portion at its forward end into which the externally threaded portion of the corresponding mounting bracket 17 is receivable. The number of rocket motors may be varied depending on the performance characteristics which are desired in the rocket vehicle. Thus, for example, a single motor may be employed in a center position and carried within the center member 12. Alternatively, a plurality of rocket motors may be mounted on the base plate 14. The rocket motors should be evenly spaced as mounted on the base plate 14 for purposes of symmetry and to promote stability in flight. Thus, when an even number of rocket motors is employed, the rocket motor is omitted from the position within the center member 12 so that in the case where two rocket motors are employed, for example, the motors would be mounted on the base plate 14 so as to be positioned on opposite sides of the plate around the center member 12. When an odd number of motors is employed, one rocket motor 18 is positioned within the center member 12 with an even number of rocket motors 18 positioned around the circumference of the plate 14. Good results have been obtained using from one to five rocket motors. By varying the number of rocket motors, speeds in the range of about 400 to 600 knots may be achieved.

The rocket vehicle may be launched from the ground or other platform by any suitable type of mobile or permanent launching means. Referring to FIG. 4, a cylindrical launching chamber 26 may be provided in which the rocket vehicle 10 is placed prior to ignition of the rocket motors. A plurality of longitudinally extending slits 28 are provided in which the fins 20 are inserted to aid in providing initial guidance at the time of launch. The altitude as well as the range attained by the target vehicle may be varied by varying the angle of launch. Thus, with a launch angle of about 15° relative to the horizontal, low altitude flight will be achieved and a relatively short range will result. Launch angles in the range of about 25° to 35° relative to the horizontal will result in higher altitude flight and also increased range.

An advantage of the use of the streaming banners is that conventional hits on the target may be counted when the target has been recovered after a flight. Also, direct hits on the large banner section will cause no flight path deviations with the result that the vehicle will continue to operate throughout the intended target flight path even after taking many hits. By varying the length and number of the streaming banners, the visual cross-section of the target which is presented to the air defense personnel can be varied as well as the flight performance characteristics of the rocket vehicle. The vehicle 10 may be easily transported with the nose cone 16, rocket motors 18 and fins 20 in assembled relation or, alternatively, the center member 12, nose cone 16, rocket motors 18 and fins 20 may be separately transported and assembled at the launch site.

The rocket vehicle may be adapted for firing of the rocket motors in sequence in order to impart a relatively constant, high velocity to the vehicle or to vary the performance of the vehicle during flight. Thus, for example, a rocket motor ignition timer (not shown) can be mounted aboard the vehicle with the timer being preset to fire the motors in the desired sequence. One sequence which could be employed in the case where five motors are mounted on the vehicle for example, would be the firing sequence which includes (a) ignition of two rocket motors during a first burn period, (b) a coast interval, (c) ignition of two other motors during a second burn period, (d) another coast interval, and finally, (e) ignition of the fifth motor during a third burn period. The number of rockets fired during each burn period and the time of ignition for each rocket motor can be varied in order to achieve the desired vehicle performance.

It is thought that the invention and many of its attendant advantages will be understood from the foregoing description, and it will be apparent that various changes may be made in the form, construction and arrangement of the parts without departing from the spirit and scope of the invention or sacrificing its material advantages, the forms hereinbefore described being merely preferred embodiments thereof.

It is claimed:

1. A rocket vehicle comprising:
   a. an elongated center member having a forward end and a rear portion,
   b. a plate attached to the forward end of said center member, said plate being adapted to receive and support the front end of at least one rocket motor,
   c. a nose cone secured to said plate,
   d. at least one rocket motor mounted on said plate and extending essentially parallel to said center member,
   e. a plurality of fins directly attached to the rear portion of said elongated center member, and
   f. said vehicle having no outer casing surrounding said at least one rocket motor between said fins and said nose cone.

2. The rocket vehicle of claim 1 wherein said center member is hollow and the rocket motor is mounted within said center member.

3. The rocket vehicle of claim 1 wherein said plate is adapted to receive and support the front end of a plurality of rocket motors, and further comprising a plurality of rocket motors mounted on said plate.

4. The rocket vehicle of claim 3 wherein said plurality of rocket motors comprises an even number of rocket motors mounted on said plate and further comprising means for attaching said rocket motors to said center member adjacent the rear portion of said center member.

5. The rocket vehicle of claim 4 further comprising at least one banner of a lightweight flexible material attached to said vehicle.

6. The rocket vehicle of claim 5 further comprising a plurality of support braces, each of said support braces being attached between adjacent fins, and a plurality of banners of a lightweight flexible material wherein at least one banner is attached to each brace.

7. The rocket vehicle of claim 6 wherein said banners have a length between about 5 to 20 feet.

8. The rocket vehicle of claim 3 further comprising at least one banner of a lightweight flexible material attached to said vehicle.

9. The rocket vehicle of claim 8 further comprising a plurality of support braces, each of said support braces being attached between adjacent fins, and a plurality of banners of a lightweight flexible material wherein at least one banner is attached to each brace.

10. The rocket vehicle of claim 9 wherein said banners have a length between about 5 to 20 feet.

11. The rocket vehicle of claim 10 wherein from two to five rocket motors are mounted on said plate.

12. The rocket vehicle of claim 1 further comprising at least one banner of a lightweight flexible material attached to said vehicle.

13. A rocket vehicle comprising:
   a. an elongated center member having a forward end and a rear portion,
   b. a plate attached to the forward end of said center member, said plate being adapted to receive and support the front end of at least one rocket motor,
   c. a nose cone secured to said plate,
   d. at least one rocket motor mounted on said plate and extending essentially parallel to said center member, e. a plurality of fins attached to the rear portion of said elongated center member, and f. a plurality of support braces, one of said support braces being attached between each pair of adjacent fins, and a plurality of banners of a lightweight flexible material wherein at least one banner is attached to each brace.

14. The rocket vehicle of claim 13 wherein said plate is adapted to receive and support the front end of a plurality of rocket motors, and further comprising a plurality of rocket motors mounted on said plate.

15. The rocket vehicle of claim 14 wherein said center member is hollow and is sized to receive a rocket motor therein.

16. The rocket vehicle of claim 13 wherein said banners have a length between about 5 to 20 feet.

* * * * *